United States Patent
Liu et al.

(10) Patent No.: US 9,317,903 B1
(45) Date of Patent: Apr. 19, 2016

(54) SELF-SIMILARITY BASED SINGLE FRAME SUPER-RESOLUTION

(71) Applicant: Pixelworks, Inc., Portland, OR (US)

(72) Inventors: Guodong Liu, Shanghai (CN); Junhua Chen, Shanghai (CN); Bob Zhang, Santa Clara, CA (US); Yue Ma, Pleasanton, CA (US)

(73) Assignee: PIXELWORKS, INC., Portland, OR (US)

( * ) Notice: Subject to any disclaimer, the term of this patent is extended or adjusted under 35 U.S.C. 154(b) by 93 days.

(21) Appl. No.: 14/011,532

(22) Filed: Aug. 27, 2013

(51) Int. Cl.
*G06T 3/40* (2006.01)
*G06T 5/00* (2006.01)

(52) U.S. Cl.
CPC ...................................... *G06T 5/003* (2013.01)

(58) Field of Classification Search
CPC .................................................... G06T 3/4076
See application file for complete search history.

(56) References Cited

U.S. PATENT DOCUMENTS

| | | | | |
|---|---|---|---|---|
| 8,675,999 B1* | 3/2014 | Liang et al. | ................... | 382/299 |
| 2005/0243109 A1* | 11/2005 | Stevens | ......................... | 345/694 |
| 2010/0067818 A1* | 3/2010 | Zhang et al. | .................. | 382/260 |
| 2011/0206296 A1* | 8/2011 | Sakaguchi et al. | ............ | 382/299 |
| 2011/0274370 A1* | 11/2011 | Kondo et al. | ................... | 382/284 |
| 2012/0026199 A1* | 2/2012 | Tanaka | .................. | G06T 3/4076 |
| | | | | 345/660 |
| 2013/0223734 A1* | 8/2013 | Tuzel et al. | .................... | 382/167 |
| 2015/0093045 A1* | 4/2015 | Turkan | ................. | G06T 3/4053 |
| | | | | 382/299 |

* cited by examiner

*Primary Examiner* — David F Dunphy
(74) *Attorney, Agent, or Firm* — Marger Johnson

(57) ABSTRACT

A method of generating a super-resolution image from a single frame includes receiving, at a processor, first image data having a first resolution as a query image layer, acquiring, by the processor, second image data as a copy image layer, generating, by the processor, at least one additional image layer as a retrieval layer, the at least one additional image layer having a resolution lower than the first resolution, wherein the lower resolution corresponds to the first resolution divided by a scaling factor, generating high resolution image data for a high resolution layer having a resolution higher than the first resolution, the generating including copying image data from the copy layer when a match is found and upscaling the query layer when a match is not found.

18 Claims, 15 Drawing Sheets

High Patch

Query Patch

FIG. 10a

High Patch

Query Patch

FIG. 10b

High Patch

Query Patch

FIG. 10c

High Patch

Query Patch

FIG. 10d

High Patch

Query Patch

FIG. 10e

SELF-SIMILARITY BASED SINGLE FRAME SUPER-RESOLUTION

BACKGROUND

Display panels or monitors continue to increase in resolution, such as 1080 p, 4 k×2 k, etc. Many image sources have smaller resolutions than the displays. When the panel displays these sources in a display with higher resolution, traditional scaling techniques do not produce high fidelity results with rich details and sharp edges, etc. Examples of these traditional techniques include one-dimensional poly phase scaling (1D scaler), bilinear interpolation, bi-cubic interpolation, edge-guided scaling, etc. Super resolution techniques offer a solution to bridge the gap between advanced, higher resolution displays and low resolution video sources.

Multi-image super resolution processes construct a high resolution image from multiple low resolution images by fusing information among them. These algorithms can bring some details in smaller ratios of magnification in zooming. When larger ratios of magnification are needed, they cannot give enough details. Further, even at smaller ratios, if the motion is not in the right range, the ability of these techniques to reconstruct high frequency details suffers. These techniques also require many hardware resources and complex logic.

Different types of single frame super resolution (SFSR) techniques exist, including those that utilize gradient profiles or edge statistics. However, they generally do not recovery enough details. Some techniques apply many examples from external image training libraries. These methods typically have high hardware requirements to store trained examples, and often bring artifacts. Other techniques find the similarity information both in same scales and across different scales of the input image and usually use a subset of the more general fractal affine mapping technique. These are not easy to implement in hardware because of the complexity.

Some self-similarity super resolution techniques utilize similarity across different scales while ignoring similarity in same scales. Other techniques rely on self similarity being more common at the same scale but in different locations and as the scale changes the amount of self similarity decreases. Self-similarity super resolution research has also identified that that image zooming can be accomplished by modifying the Non-Local (NL) means denoising algorithm. The research also determined that super resolution using an external database of examples can be implemented by repeating the scaling several times, which reduces the size of the required database and allows for more flexibility in the final scaling ratio. For the most part, self-similarity super resolution process treat the entire image as the example data base and sometimes even multiple resolutions of the same image. This leads to a very expensive, if not physically impossible, hardware design.

Currently, no solutions exist that involve an inexpensive hardware solution that maintains all of the advantages of the full image approaches and have complexity based upon the output resolution required and not the input resolution required.

BRIEF DESCRIPTION OF THE DRAWINGS

FIGS. 10a-e show embodiments phases of projection coordinates in a super resolution process.

DETAILED DESCRIPTION OF THE EMBODIMENTS

The super resolution process may develop data for an image at different resolutions to produce a higher resolution picture. The image data at a particular resolution may be referred to as an image layer in this discussion. The process discussed herein uses different image layers for different processes depending upon the initial resolution and the high resolution at which the image is being produced. These layers are referred to as the retrieval, query (or input layer), copy, and high (or output) layers. The input layer refers to the image data at the resolution used as a base layer for the next higher level of resolution. For example, when the process begins, the input image layer consists of the image data at the original, low resolution.

The retrieval layer consists of image data for the same image but at a resolution lower than the input layer resolution. For example, this layer typically results from downsampling the input layer, and is the layer that is matched to a patch of the input layer. The input layer is also referred to as the query layer, as it is the layer in which patches are identified and then matched to the retrieval layer. The copy layer is the image layer from which the image data is copied, and the high layer is the resulting high resolution image from the process. The input layer and high layer patches are located in the same relative position of the image. The copy and retrieval patches are also located in the same relative position of the image. The offset between the query patch and the retrieval patch is similar to the offset between the copy patch and the high layer patch. These will be discussed in more detail with regard to FIG. 2.

The process may iterate as many times as needed or as possible before the image quality degrades too far. In each successive iteration, the high layer from the previous iteration becomes the input layer for the next iteration. That is, the image data generated at the high resolution for a previous iteration become the input image data for the next step.

Similarly, the terms 'low resolution' and 'high resolution' apply to the input resolution and the output resolution obtained in any given step. The retrieval layer has an even lower resolution than the input layer. If the copy and query layers have different resolutions, the copy layer has a lower resolution than the query layer, but a higher resolution than the retrieval layer. Regardless of whether the copy layer and query layer have the same or different resolutions, they will both have resolutions higher than the retrieval layer and lower than the high layer.

Figure 1:
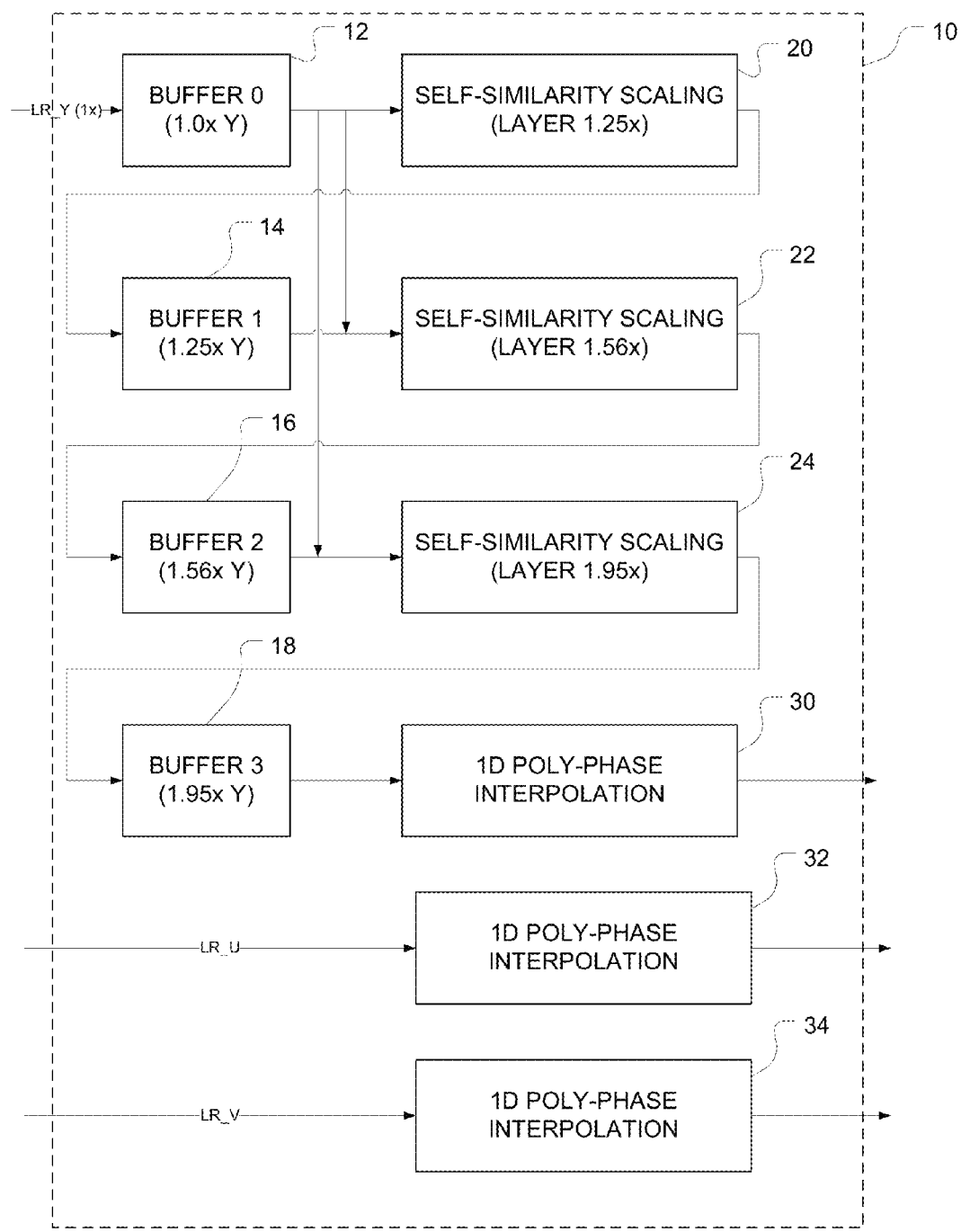
FIG. 1 shows an embodiment of an image processor for super resolution.

FIG. 1 shows an embodiment of an image processor that performs a self-similarly based super resolution process. A self-similarity process refers to the fact that the process only uses data contained in one frame the low resolution of image data to generate a new frame of image data of the same image, but at a higher resolution. That is, the process looks for similar objects within the same frame that differ only in size. The processor may consist of a central processing unit in a computer system having a display, a dedicated image processor or an image post-processor. The buffers described below may reside within the processor or may reside external to it.

As shown in FIG. 1, the processor only performs the process on the luma component (Y), in order to decrease the calculation time and hardware requirements. In this particular embodiment, the chroma components (U, V) scale through a one-dimensional (1D) poly-phase interpolation process, also referred to as 1D scaler. However, all components may undergo this process, no limitation to only processing the luma components should be implied from the examples shown here.

The scaling is done layer by layer from coarse to fine in the iterative process discussed above, as needed to obtain a particular resolution. Each layer is scaled by self-similarity based scaling. The scaling ratio, or layer ratio, determines the resolution of the layers. In the examples here, the scaling ratio for adjacent layers is 1.25×(5/4×). This provides the ratio for one direction. The 2D ratio typically shows as pow(1.25, 2)). Other layer ratios can be selected, such as 6/5×, 4/3×, etc. This discussion only discusses 1.25× but the process can easily implement other ratios based on the method from 1.25×. The elements of FIG. 1 have labels identifying to which layer they correspond for ease of understanding.

In FIG. 1, the processor receives as an input the low resolution luma component LR_Y(1×) at a buffer 12. The processor then performs self-similarity scaling to produce the high layer 1.25× at 20. One should note that FIG. 1 shows each iteration with the next higher resolution as separate modules within the processor. However, for hardware efficiency the same hardware except for the buffers will be used for each iteration. The details of the self-similarity scaling will be discussed in more detail below.

The input image is stored in the buffer and used in the next two iterations. The output of the first iteration, in this example the 1.25× data, is stored in the buffer 14. The next iteration scaling at 22, resulting in 1.56× data is stored in buffer 16. The last iteration for the 3 layer SR process at 24 is stored in buffer 3. This data may further undergo 1D scaling at 30, as will the chroma components at 32 and 34.

Figure 2:
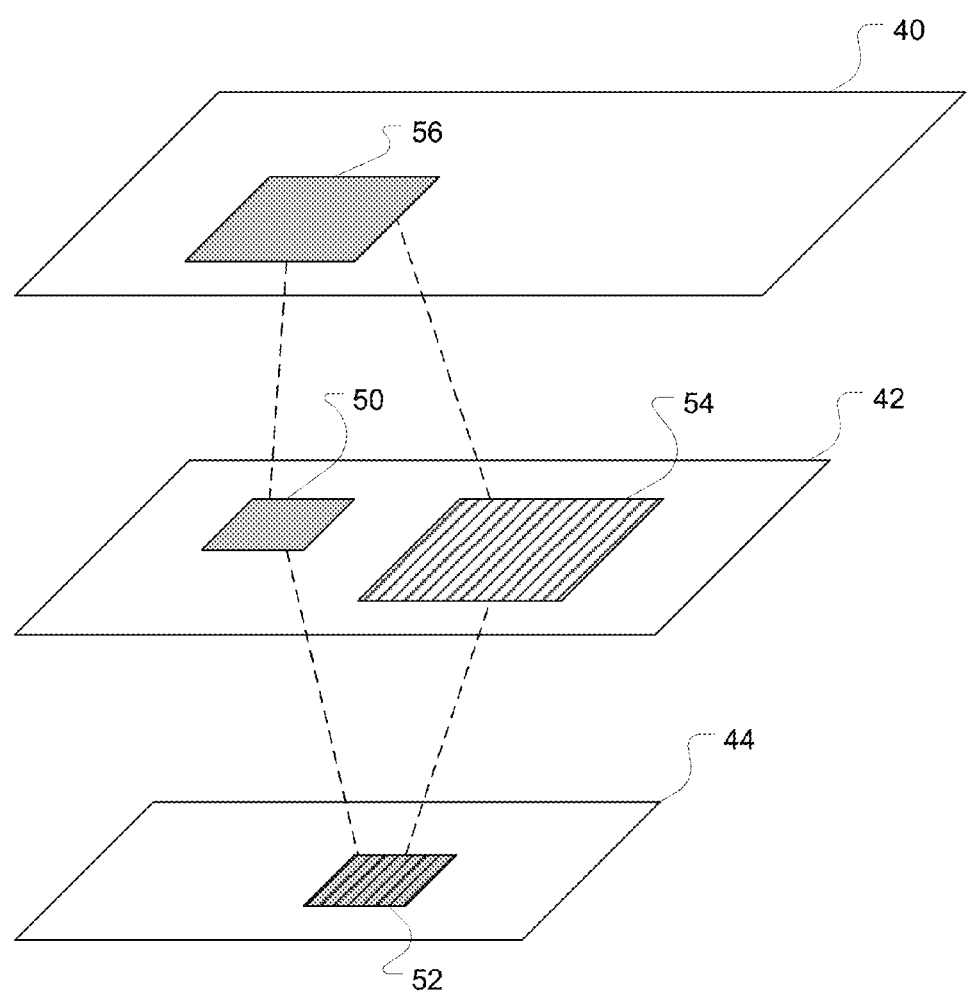
FIG. 2 shows a graphical representation of a super resolution process.

FIG. 2 shows a graphical representation of a method to produce the self-similarity super resolution data. Layer 42 consists of the input image. As mentioned above, this may consist of the original low resolution image, or may be generated in later iterations. The process takes the input image and down samples it to a resolution equal to dividing the original resolution by the scaling factor. In this iteration, the query layer is the input image layer. A patch 50 from the query layer is matched to a patch in the down sampled retrieval layer. A patch 54 from the query/copy layer 42 that corresponds to the information contained in the patch 52 from the retrieval layer is then copied to the position of patch 56 in the high layer.

The intent is to provide more detail and information to the patch 56 than would be obtained by merely scaling up the patch 50 to the patch 56. For this process, there is a difference between position and information. The patch 50 is in the same relative position as the patch 56 except of sub-pixel offset, patch 50 and 52 are similar, and patch 54 is the high resolution version of patch 52. In this manner, more detail and information is provided to the high layer without having to rely upon other frames of image data.

Many applications require scaling 2×. Here, take scaling 2× as example. Using a scaling ratio of 1.25, 3 iterations, called 3-layer SR (super resolution), produces an approximation of 2×. The scaling ration 1.25×1.25=1.56, and 1.25×1.56=1.95, or approximately 2×. For the given scaling ratio, 1D poly-phase interpolation or decimation can be used to deal with the 3-layer SR image to get the final scaled image.

If the situation requires high quality scaling, one can calculate ceil(log 1.25(Sx)) times self-similarity based SR (SSSR) to obtain the scaled image SR_Img, where Sx is the scaling ratio. The result from SSSR of the last iteration becomes the input LR image for SSSR of a next iteration. One can then down sample SR_Img by 1D poly-phase decimation to obtain the final scaled image with scaling ratio Sx.

The embodiments described here for 1.25× SR utilize patch similarity between layer 1× and layer 0.8×. Generally, the process does patch matching between the layers, then copies the corresponding data in 1× to the patch of 1.25×. Although there are similarities between layer 1× and other layers with scaling ratios less than 0.8, such as 0.64, the similarity between layer 1× and layer 0.8× provides the best match. For each patch in layer 1×, the most similar patches will nearly all exist in layer 0.8×, if there is similar patch in all layers less than 0.8×. The process obtains the best results in the 0.8× layer. For this discussion, the layer 1.25× becomes the high layer, layer 1× becomes the query and copy layers, and layer 0.8× becomes the retrieval layer. At this first iteration, the process requires copying data from layer 1× to layer 1.25×, so layer 1× is also the copy layer. One should note the relationship between the layers. The high layer results from 1.25× the input layer of 1×. The retrieval layer results from down sampling layer 1× by scaling ration 0.8 (1/1.25).

Figure 3:
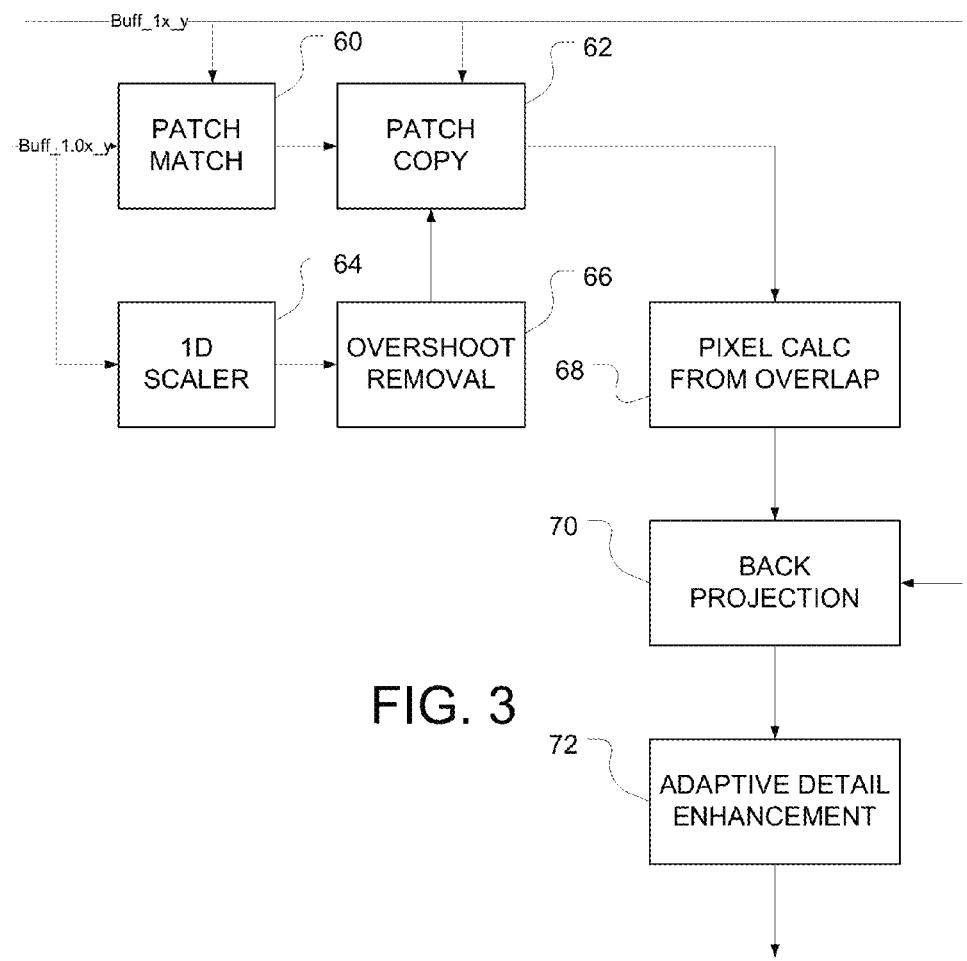
FIG. 3 shows a flowchart of an embodiment of a super resolution process.

FIG. 3 shows an overview of the process for generating a high resolution image from a low resolution input image. The patch matching 60 and patch copy process 62 generate a first version of the high resolution image data. In addition, the low resolution data is scaled up using a 1D scaler at 64, with overshoot removal at 66. As will be discussed in more detail later, pixel calculations with overlap are performed at 68, back projection at 70, and application of adaptive detail enhancement at 72. This results in generation of high resolution data.

Figure 4:
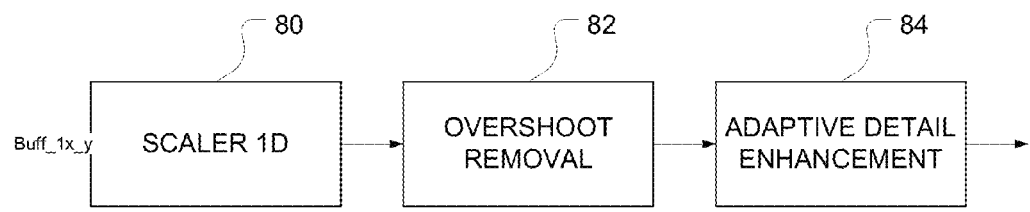
FIG. 4 shows a flowchart of an alternative embodiment of a super resolution process.

For the first iteration, because the layer 1.25× is very close to layer 1×, the result of 1D poly-phase interpolation with high quality filters is similar to that of self-similarity except that it has fewer details. These details will likely be supplied from later iterations. In order to decrease hardware cost, 1D poly-phase interpolation can replace self-similarity scaling for layer 1.25×. FIG. 4 shows an example of this process. The 1D scaler is applied to the data at 80, overshoot removal is performed at 82 and adaptive detail enhancement at 84.

Figure 5:
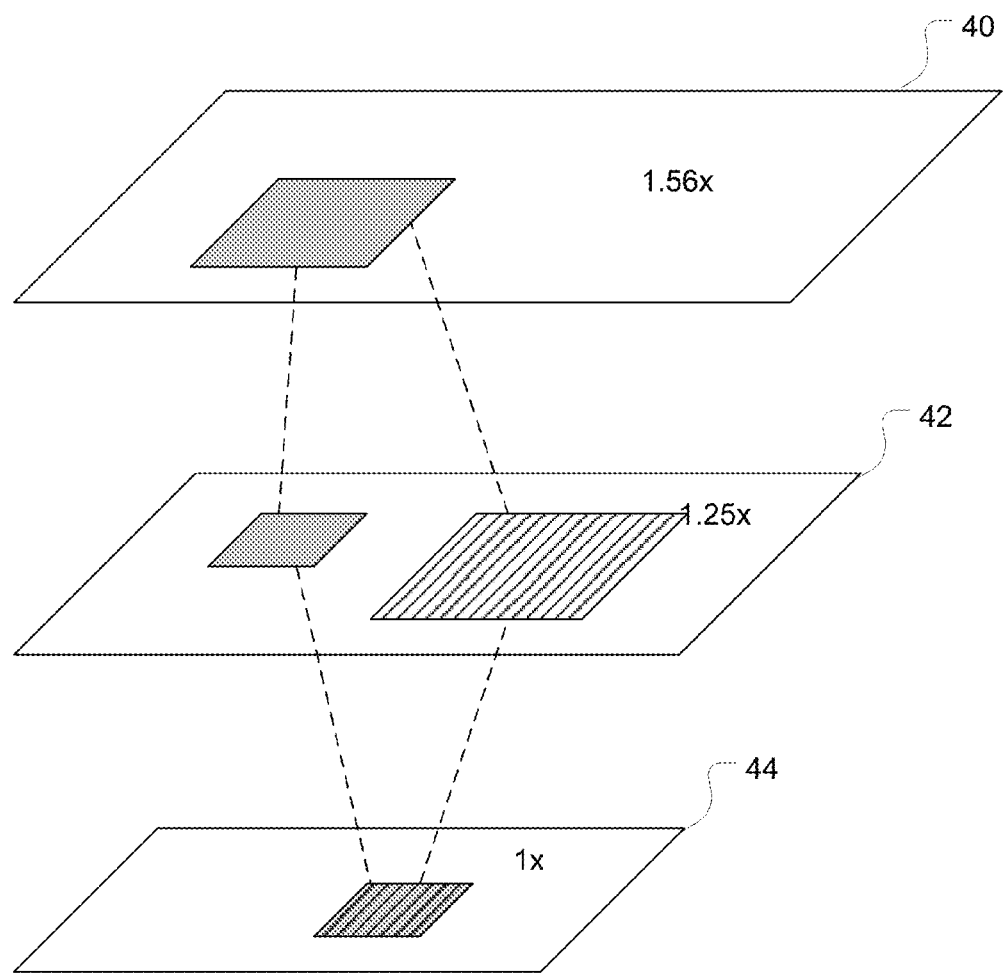
FIGS. 5-8 show alternative graphical representation of super resolution process.

This process repeats at FIG. 5, but for the next resolution layer (layer 1.56×). In this instance, the 1× image data becomes the image data used as the retrieval layer 44. However, this image data doesn't come from the original low resolution (1×) image directly, it is acquired by down sampling the high resolution image data from the previous iteration. This method can improve patch matching remarkably.

The process then repeats using layer 1.25× as the query and copy layer 42 and generates the high layer 40 at 1.56×.

Figure 6:
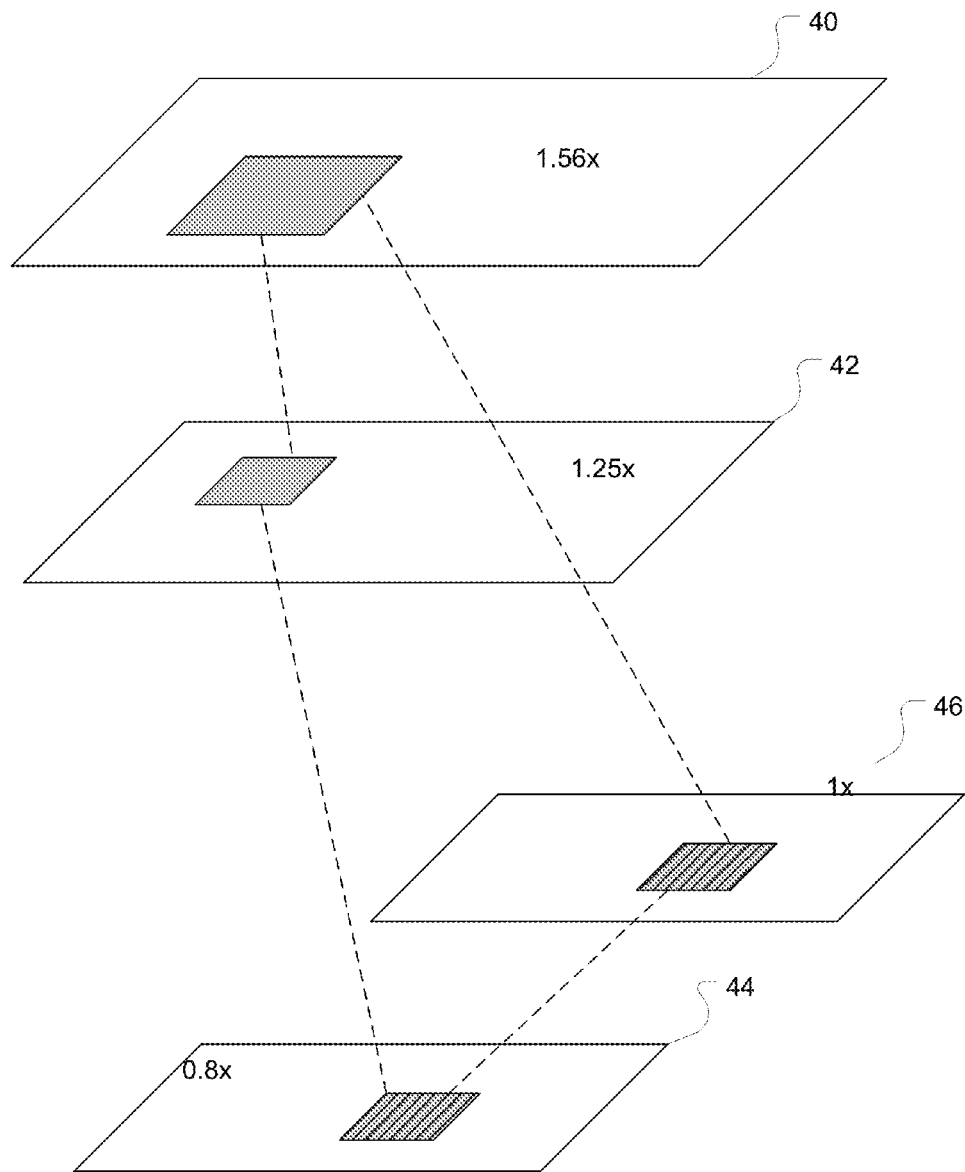
Figure 7:
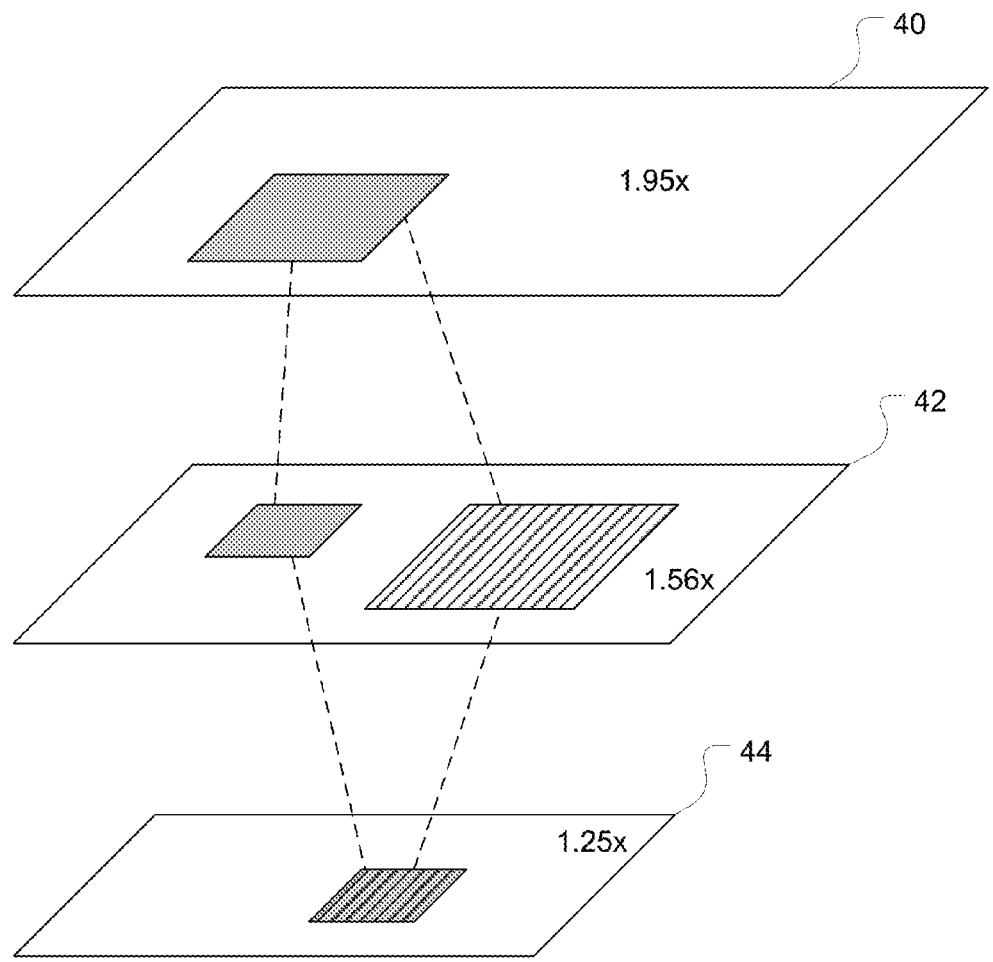
Figure 8:
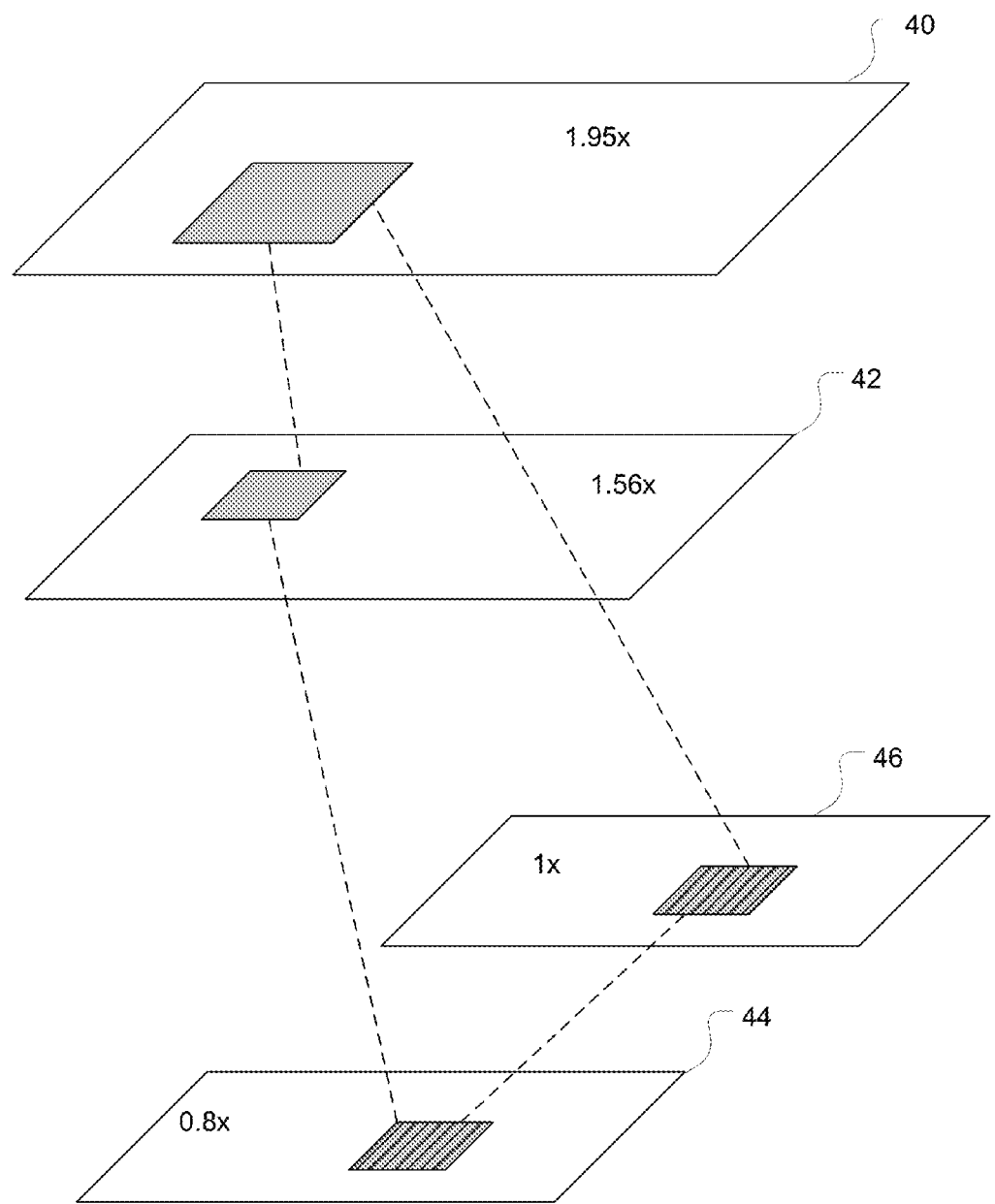

In addition to using the 1.25× layer as the copy layer, it is desirable to use the original input layer, or 1×, as the copy layer as shown in FIG. 6. The reason is that layer 1× has more natural looking details for human eyes without blur from magnification. In FIG. 6, the retrieval layer 44 becomes 0.8×. The scaling ratio between query layer 42 (1.25×) and 0.8× is now $1.25^2$, the same as the ratio between the high resolution (1.56×) layer and the original input layer (1×), 46. FIGS. 7 and 8 show similar situations. In FIG. 7, the self-similarity is between layers 1.25× and 1.56× to generate the high layer of 1.95×. In this iteration, the 1.56× data is the input resolution image data and layer 1.25× is the retrieval layer which, again, is generated by down sampling from layer 1.56× using polyphase 1D scaling.

FIG. 8 shows a representation of the layers with self-similarity between layer 1.56× and 0.8×, in which the 1× layer is used as the copy layer. Note, each iteration in the process uses the current input resolution and the original 1× layer for the copy layer. It is necessary to fuse data from both these copy layers. For a pixel (or a patch) in high layer, if the SAD of matching for copying current input resolution is less than that for copying 1× layer, the process uses more data of the current input resolution. Otherwise, the process uses more data of 1× layer. However, it is found that SAD for copying current input resolution is often less than SAD for copying 1× layer in many experiments. Because 1× layer has more natural and exquisite details, it is better to use more data of 1× layer when the SAD (sad_1×) for copying 1× is not very much bigger than the SAD (sad_in) for of the input layer and there are no strong edges in the projected region, a neighborhood of query patch, in query layer. The edge strength (edge_strg) of query patch is the accumulation of edge magnitude for each pixel in query patch. A simple formula of deciding using input layer or 1× layer is as follows. If sad_in>=sad_1×+min(max(edge_strg−Edge_Thr, −Edge_Adj_N), Edge_Adj_P)*Edge_K, the process copies 1× layer. Otherwise, the process copies the input layer. In this formula, Edge_Thr is a threshold that determines the tradeoff between natural details and edge performance. Edge_K is a gain that controls magnitude of adjust value about edge strengths. Edge_Adj_N and Edge_Adj_P are lower and upper bounds of adjust value about edge strength respectively.

As discussed above, the patches in the high layer, which may be referred to as a high patch, define a position. A patch in the query layer corresponds to the position of the patch in the high layer and becomes the query patch which is used for matching with patches of a search window in the retrieval layer. The self-similarity scaling deals with patches of dimensions corresponding to the dimensions of the patches in the high layer. The high layer undergoes self-similarity scaling in a zigzag fashion, shown in FIG. 9.

Figure 9:
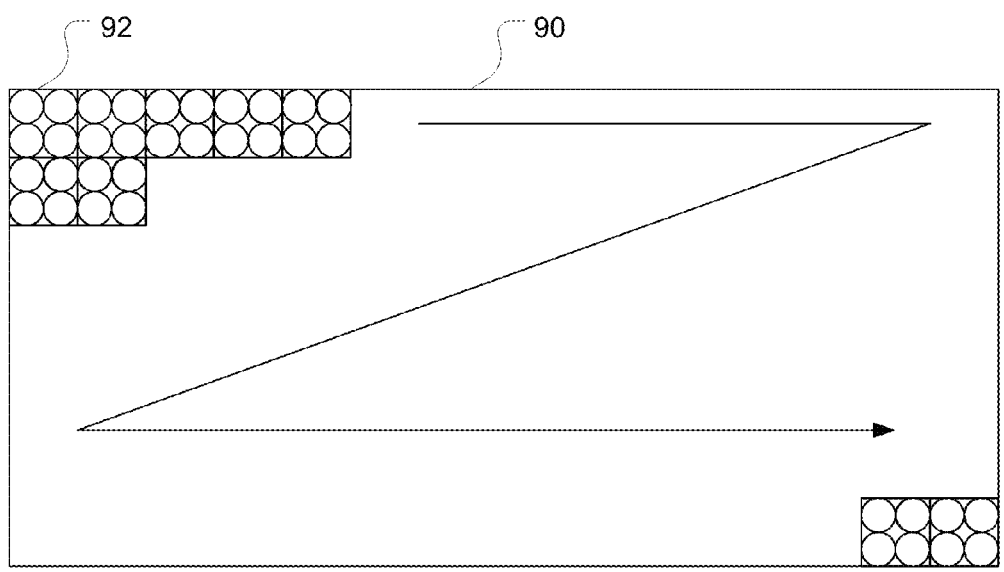
FIG. 9 shows an embodiment of a search process.

In FIG. 9, the image layer being processed is represented as 90. Each patch, such as 92, is defined with a particular dimension, and then the image layer is processed in scan order, line after line. The dimensions of the patch in the high layer may be 1×1, 2×2, 3×3, etc. The process selects the corresponding query patch which has the most accurate representation of the high patch. The query patch size should not be bigger than 5×5 or smaller than 4×4 because bigger patches results in fewer matches and smaller patches results in poorer scaling results. From many experiments, the appropriate size of query patch is 4×4 or 5×5.

For example, consider a 2×2 patch in the high layer. For each 2×2 patch in the high layer, the process projects its top-left pixel coordinate to query layer, determines a coordinate in query layer, then selects a 4×4 patch around this coordinate in this layer. The selected query patch should consist of the one that surrounds the high 2×2 patch completely. The same selection method is for both horizontal and vertical directions, so this discussion will only address the horizontal direction as an example. When up scaling, a high resolution can have one of 5 phases relative to a low resolution pixel. It can be aligned, phase=0, or off by a fraction of a pixel. There are 5 different cases for projection coordinates according to their fractional parts. The fractional part called phase can be 0, 0.2, 0.4, 0.6, or 0.8. Each of these are shown in FIGS. 10*a*-10*e*.

For a 4×4 query patch, the process uses sample error to evaluate its high frequency level and to judge whether the matching is good enough. Initially the process calculates all the ½ pixels about the patch, $$b(i,j)=(a(i,j)+a(i,j+1)+a(i+1,j)+a(i+1,j+1))/4$$

The sample error is calculated as, $$\text{samp\_err} = \sum_{i=1,j=1}^{i<4,j<4} \text{abs}(a(i,j) - b(i,j))$$

Figure 11:
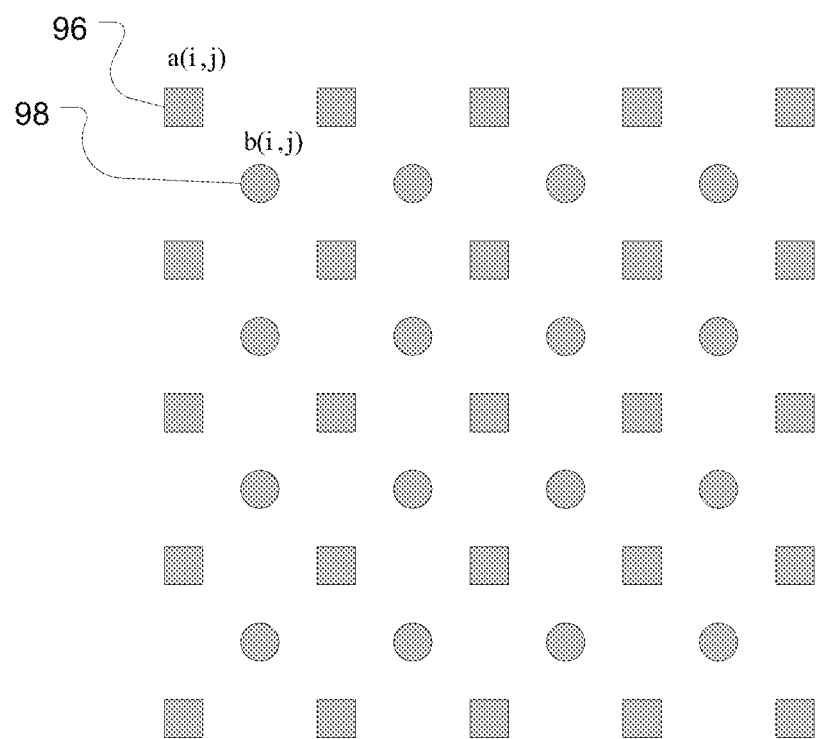
FIG. 11 shows an embodiment of a sample error determination process.

FIG. 11 shows an example of the interpolated pixels as circles and the corner pixels of query patch. Examples of the a(i, j) and b(i, j) pixels are shown as 96 and 98 in FIG. 11.

The process performs global search between the query patch and all the patches in the retrieval layer. It often finds several patches that achieve the best match quality. While a full image search can be done, it is too time-consuming and requires many hardware resources. Moreover, many experiments designed by Freedman, et al. *Image and Video Upscaling from Local Self-Examples*, ACM Transactions on Graphics, 2010, prove that when the search range reaches a certain value, the search quality is stable and good enough. Increasing this value more does not give significantly better performance. Therefore, local search can replace global search. Experiments indicate that a search range of about [−10, 10] among adjacent layers can give good performance.

The search is first carried out between a query patch and each retrieval patch in the search window of the retrieval layer given search range. The match criterion uses SAD (sum of absolute difference) between two patches. A lower SAD result means better matching. After the search, several of the best matched patches are selected. This search is in int-pixel precision. Sub-pixel (½, ¼ pixel of int-pixel in retrieval layer) search can be utilized around each selected int-pixel match position in order to get better matching performance. Here, the sub-pixel patches are not interpolated by use of pixel data of retrieval layer. It is better to construct the sub-pixel patch using poly-phase interpolation of corresponding pixel data in copy layer. This process can improve matching.

As discussed above, matching occurs between query layer and retrieval layer, and the retrieval layer is a downsampled version of the corresponding copy layer. The copy layer can play the role of retrieval layer and the search window can be obtained from the copy layer. The scaling ratio between the retrieval layer and the copy layer is 1.25. This means that the search range is 1.25 times of that in the retrieval layer. For each pixel in the search window of copy layer, a 4×4 retrieval patch whose top-left pixel is close to this pixel can result from 1D poly-phase interpolation. One kind of the horizontal interpolation phases are 3/4, 0, 1/4, 2/4. The alternative interpolation phases can be 5/8, 7/8, 1/8, 3/8. The vertical interpolation phases are same as horizontal direction.

Figure 12:
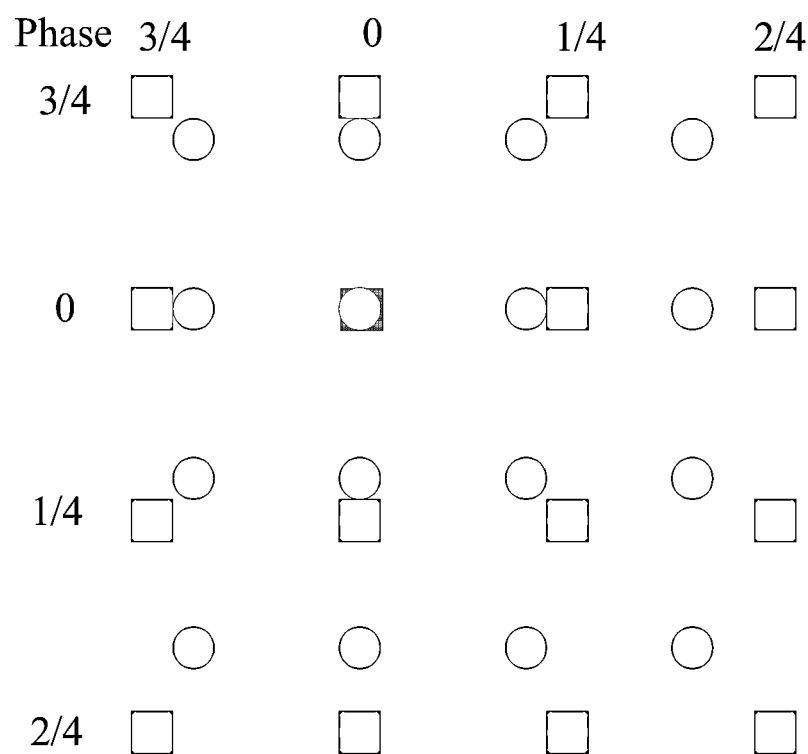
FIG. 12 shows an embodiment of an interpolated 4×4 retrieval patch.

FIG. 12 shows the interpolated 4×4 retrieval patch whose pixels are represented by rectangles while original pixels in copying layer is represented by circles. The circles representing the 4×4 high resolution patch are totally surrounded by the 4×4 retrieval patch represented by rectangular pixels. The low resolution patch fully embodies its corresponding high resolution one. This improves the matching performance.

Returning to FIG. 3, one can see that after patch matching, several or only one most matched patch in retrieval layer are found. Because there is pixel offset between query patch and high patch, and sub-pixel match is applied, it needs to interpolate the high resolution data in copy layer. This process copies them to the position in the high layer corresponding to the query patch at 62 in FIG. 3. When the SAD of the match is very large, or is much bigger than samp_err, the matching has little confidence. For this case, the 1D poly-phase interpolation based results have more accuracy than the copied data for current positions in high layer.

Figure 13:
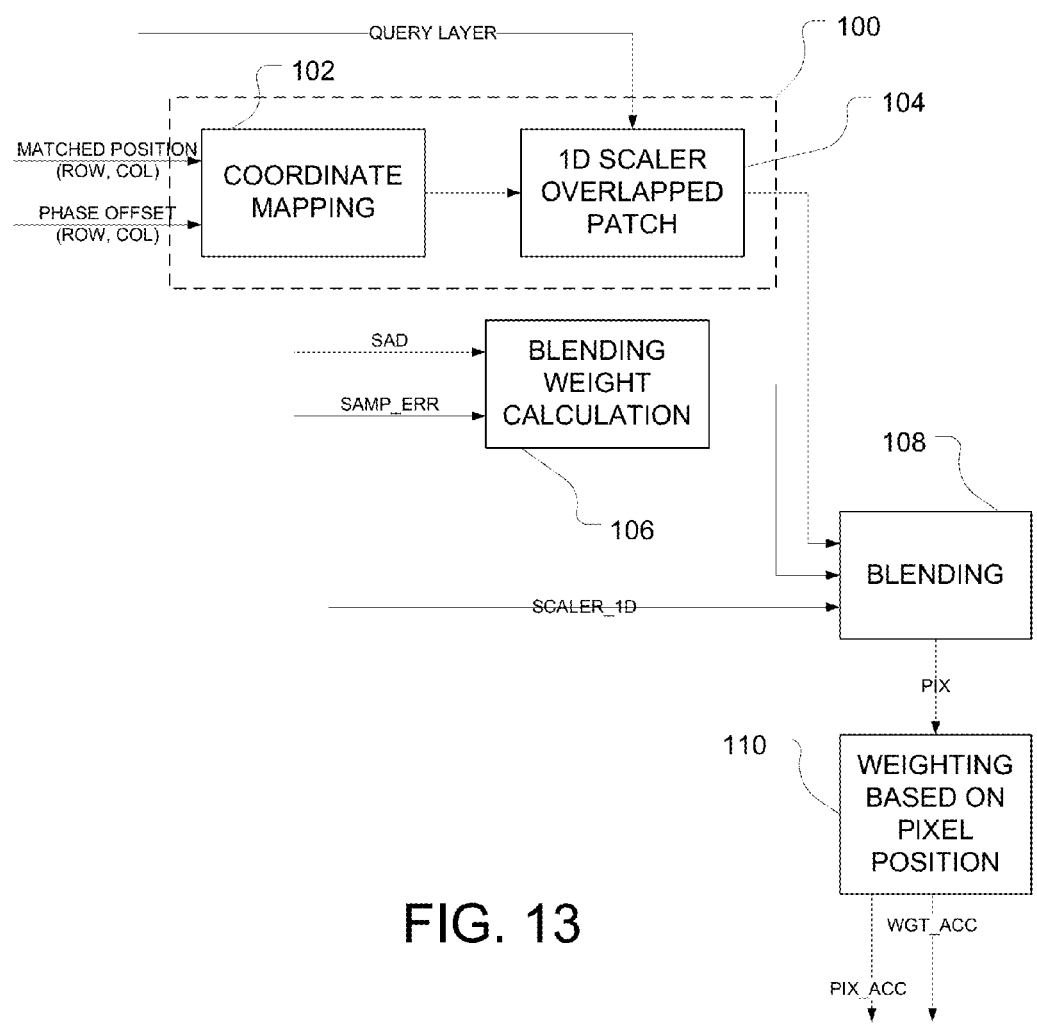
FIG. 13 shows an embodiment of a blending process to produce super resolution image data.

In order to keep consistent among neighboring patches and reduce artifacts such as blockness, overlap and blending is applied at 68 in FIG. 3 when copying this data. FIG. 13 shows an example of patch copy. In the copying block 100, a coordinate mapping process 102 receives as its inputs a matched position and a phase offset. The resulting overlapped data is then calculated by use of poly-phase interpolation with data from copy layer at 104. The resulting interpolated and overlapped data comes into the blending process 108, as well as the output of a 1D scaler of query patch, and the blending weight calculation, discussed below. The resulting blended pixel values are then weighted according to their position at 110.

In order to keep consistency among adjacent patches, it is necessary to copy data in overlapping mode. Extend the 2×2 high patch to 3×3 one towards right and bottom. So 1D poly-phase interpolation is used for overlapped patch in 104 of FIG. 13. Different weight can be applied for each position. For horizontal direction, the weight vector Wgt_Vect (for example, weight vector is equal to (6, 8, 2)). Vertical directions have the same weights. So for these 3×3 datum, the weight can be calculated by Wgt_Vect'*Wgt_Vect.

Because each pixel in the high layer is filled at least once, the pixel value is calculated by weighted average:

pix_val=pix_acc/wgt_acc.

Returning to FIG. 3, once the overlap process is completed, the image data is back projected at 70. A typical back projection formula consists of:

$$\hat{X} = \arg\min_{X} \|DGX - Y\|_2^2.$$

Here, G is Gaussian filter, D is the down-sampling operation, Y is the original low resolution image (layer 1×), and X is the estimated high resolution image. Back projection will generally be performed at each iteration, otherwise the artifacts will accumulate and their removal will be less than successful. The process of back projections allows for detection and resolution of errors. An example of this process is shown in FIG. 14.

Figure 14:
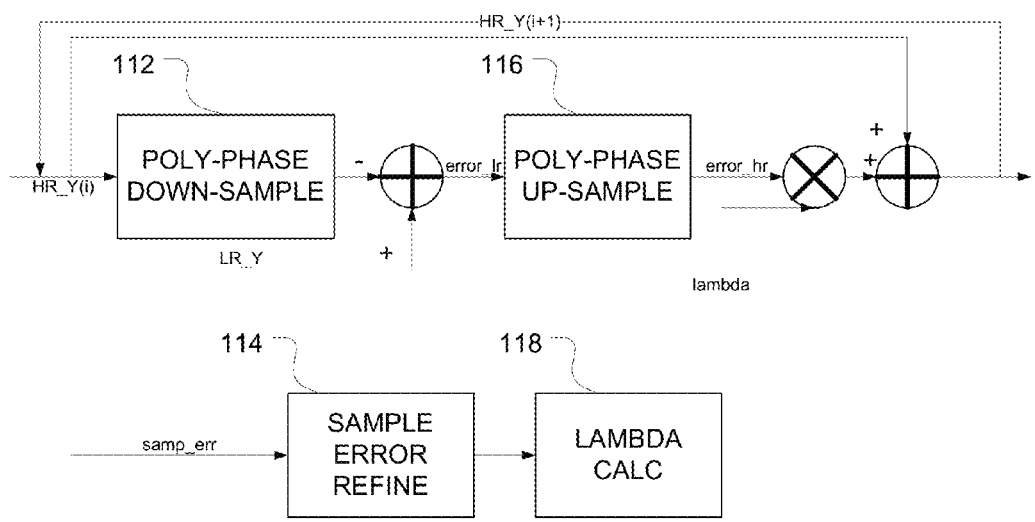
FIG. 14 shows an embodiment of a back projection process.

In FIG. 14, the process begins by downsampling the high resolution data copied to the high layer at 112 and subtracting it from the original input image data. The error is then upsampled at 116 to create the high resolution error. This is then multiplied by a value lambda that results from refining the sample error previously discussed at 114 and converting that refined error at 118. The resulting lambda value multiplied by the error is added to the high resolution image data in the high layer to produce the high resolution image data for the next step.

Once back projection is completed, the image data undergoes adaptive detail enhancement. Adaptive detail enhancement enhances detail after patch copying. This block can be done before or after back projection. It only enhances moderate edge/texture, but not smooth region and strong edge/texture. Boosting high frequency content can provide better results. In order to enhance a pixel, its 3×3 neighborhood is considered. The unsharp mask matrix can be [−1, −1, −1; −1, 8, −1; −1, −1, −1]. Other types of filter can replace the example filter. Convolve this matrix with 3×3 image data, then multiply the result by a gain to get pixel delta. This delta should be base value for enhancement. But the delta should be adjusted according to the detail level. In smooth region or strong edges/textures region, the delta should be smaller. The delta isn't adjusted in moderate texture region.

Figure 15:
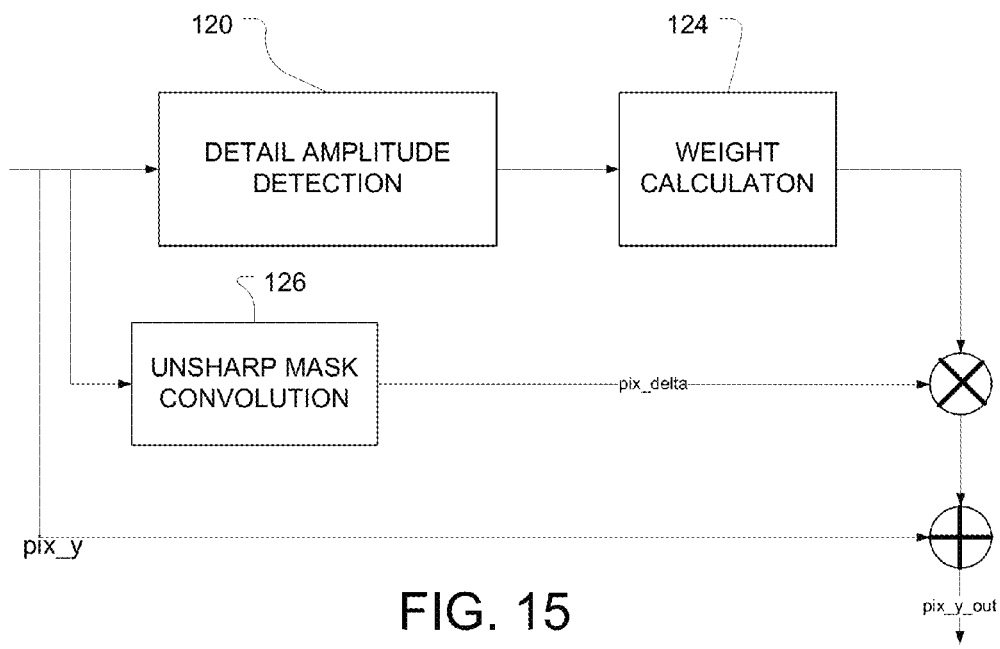
FIG. 15 shows an embodiment of an adaptive detail enhancement process.
Figure 16:
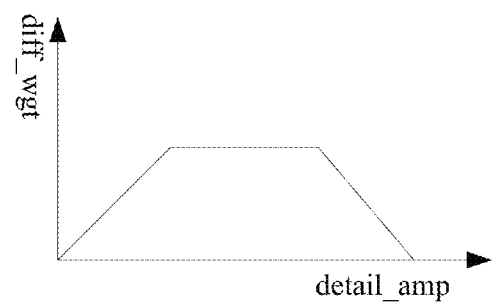
FIG. 16 shows a graph of a weight calculation used in the adaptive detail enhancement process.

An example of an adaptive detail enhancement process is shown in FIG. 15. Unlike other approaches, the adaptive detail enhancement is applied at each step of the process. In FIG. 15, the weight calculation at 124 is performed according to the weight versus directional difference shown in FIG. 16. This prevents the enhancement of noise for small differences and reduces the amount of ringing for strong edges.

Figure 17:
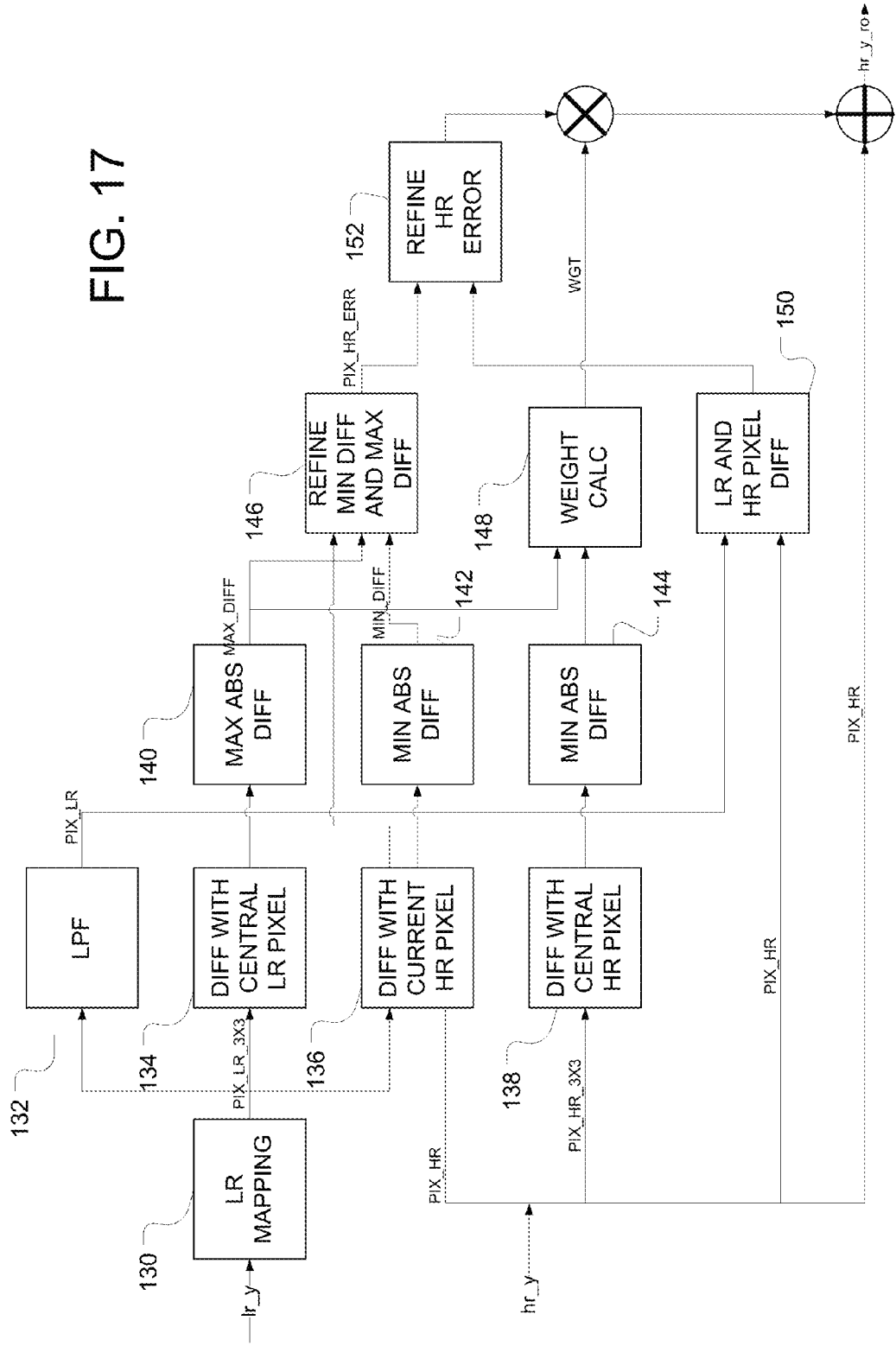
FIG. 17 shows an embodiment of an overshoot removal process.

Once the adaptive detail enhancement has been applied, the process may need to perform overshoot removal. Overshoot results from the filter application in the 1D scaling process, detail enhancement and even the back projection process; and can cause an undesirable haloing artifact around edges. Overshoot removal cleans this up. An example of an overshoot removal process is shown in FIG. 17. The principle of removing overshooting is as follows: for a pixel in high layer, if it has obvious difference calculated in 134 and 140 with its neighboring pixels in 3×3 window, and there is no or very little pixel difference calculated in 138 and 144 among its projected 3×3 window in 1× layer, overshooting takes place. The basic adjusted value calculated in 150 is the difference between current pixel and the average pixel of 3×3 window in 1× layer.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of generating a super-resolution image from a single frame, comprising:
    receiving, at a processor, first image data having a first resolution as a query image layer;
    acquiring, by the processor, second image data as a copy image layer;
    receiving at a processor, second image data having an original resolution as a second copy layer;
    generating, by the processor, at least two additional images layer as retrieval layers, the retrieval layers having a resolution lower than the copy layers, wherein the lower resolution corresponds to a copy layer resolution divided by a scaling factor;
    generating high resolution image data for a high resolution layer having a resolution higher than the first resolution, the generating including:
    selecting a pixel position in the high resolution layer;

determining if a match is found between a query patch in the query layer, the query patch corresponding to the pixel position in the high resolution layer;

when a match is found, determining if the query patch is biased towards a strong edge;

when the query patch is biased towards a strong edge, copying image data from the second copy layer; and repeating the receiving, acquiring, generating at least one additional image layer, and generating high resolution image data through as many iterations as needed to achieve a desired resolution.

2. The method of claim 1 wherein the second image data has a resolution equal to a resolution of an original input image data.

3. The method of claim 1 wherein the second image data has a resolution equal to a resolution of the high resolution image data for a previous iteration to a current iteration.

4. The method of claim 1 wherein the query layer is an input image.

5. The method of claim 1 wherein the query layer consists of self-similarity high resolution image data from a previously generated high resolution layer.

6. The method of claim 1 wherein the retrieval layer consists of a down sampled version of a previously generated high resolution layer.

7. The method of claim 1 wherein the retrieval layer consists of a down sampled version of the copy layer.

8. The method of claim 7, wherein down sampling the copy layer further comprises down sampling the copy layer with different filter phases to obtain sub pixel offsets of the retrieval layer.

9. The method of claim 1 wherein the copy layer and the query layer are two different layers.

10. The method of claim 1 wherein the query patch corresponding to the position in the high resolution layer is selected to most completely surround the patch in the high resolution layer.

11. The method of claim 1 wherein searching a window in the retrieval layer comprises comparing the retrieval patches to the query patch to determine a match.

12. The method of claim 11, wherein the comparing comprises performing a sum of absolute differences measurement, and producing a match confidence based upon a sample error.

13. The method of claim 1 wherein copying image data from the copy layer comprises:

determining that no edges exist in the query patch; and copying a nearest int-pixel data from the copy layer.

14. The method of claim 1 wherein generating self similarity high resolution image data comprises blending image data copied from the copy layer with image data generated by a 1D scaler of the query layer based on a sum of absolute difference (SAD), and weighting the blended data based on pixel position for overlap.

15. The method of claim 1 further comprising applying back projection at each layer.

16. The method of claim 1 further comprising performing detail enhancement at each layer.

17. The method of claim 1 further comprising removing overshooting in each layer.

18. A method of generating a super-resolution image from a single frame, comprising:

receiving, at a processor, first image data having a first resolution as a query image layer;

acquiring, by the processor, second image data as a copy image layer;

generating, by the processor, at least one additional image layer as a retrieval layer, the at least one additional image layer having a resolution lower than the first resolution, wherein the lower resolution corresponds to the first resolution divided by a scaling factor;

generating high resolution image data for a high resolution layer having a resolution higher than the first resolution, the generating including copying image data from the copy layer when a match is found and upscaling the query layer when a match is not found, wherein determining whether a match is found comprises selecting a pixel position in the high resolution layer, then identifying a query patch in the query layer corresponding to the pixel position in the high resolution layer and searching a window in the retrieval layer; and determining if a pixel in the high resolution image data require overshoot removal; and when overshoot removal is required, adjusting a value of the pixel in the high resolution image using a difference between the pixel and information from the copy layer.

* * * * *